Oct. 5, 1948.   P. A. JOHNSON   2,450,478
AUTOMATIC ELECTRIC FLUID HEATING
AND COOLING SYSTEM

Filed June 12, 1944   2 Sheets-Sheet 1

INVENTOR,
Paul A. Johnson.
BY Roy E. Hamilton,
Attorney.

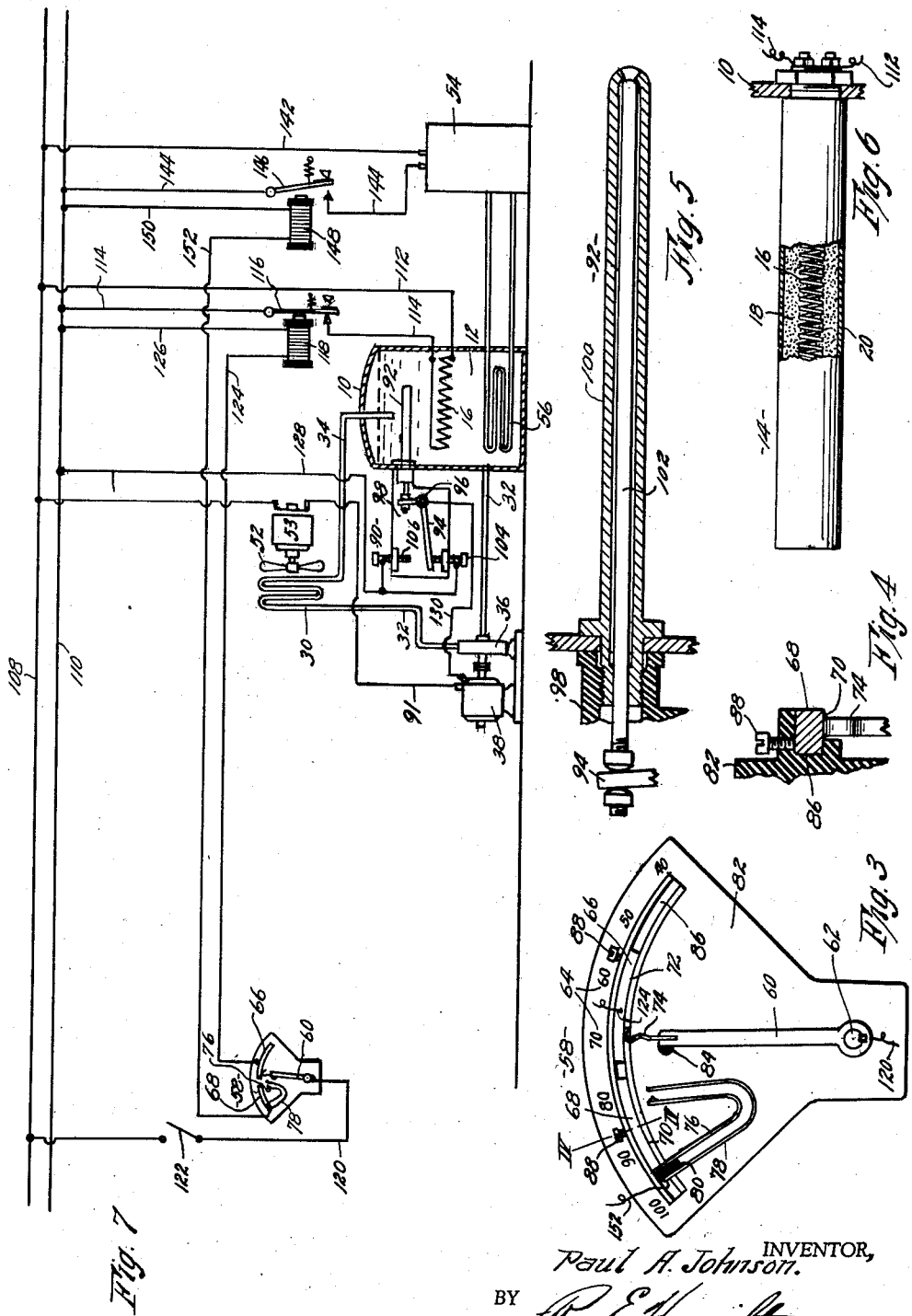

Patented Oct. 5, 1948

2,450,478

UNITED STATES PATENT OFFICE 2,450,478

AUTOMATIC ELECTRIC FLUID HEATING AND COOLING SYSTEM

Paul A. Johnson, Kansas City, Mo.

Application June 12, 1944, Serial No. 539,965

5 Claims. (Cl. 257—3)

This invention relates to improvements in combined heating and cooling systems for enclosures whereby the atmospheric temperature conditions will be regulated to meet the continual year-round seasonal changes.

The principal object of the present invention is the provision of an air temperature regulating system including a fluid container, a heat exchanger having supply and return connections with said fluid container, an electric heater immersed within the fluid of said container, a refrigerator having a cooling unit immersed in the fluid of said container, and an electric circuit control actuated by means of differential of temperatures in the room being regulated whereby to selectively operate said immersion heater and refrigerator to maintain the temperature in said room within said predetermined limits.

Another object of this invention is the provision of a heating and cooling system wherein an immersion electric heater serves to heat a circulating fluid medium whereby heat is carried to the desired point for distribution.

A further object of the invention is the provision of a circulating fluid medium system having separate means whereby the temperature of the fluid may be automatically and selectively raised or lowered.

Other objects are simplicity and economy of construction, efficiency and economy of operation, and adaptability for new installations and for use with heating and cooling systems now in general use.

With these objects in view as well as other objects which will appear during the course of the specification, reference will now be had to the drawings wherein:

Fig. 3 is an enlarged elevational view of the thermostatic control mechanism.

Fig. 4 is an enlarged fragmentary sectional view taken on line IV—IV of Fig. 3.

Fig. 5 is a sectional view of the bimetallic thermostat used in the fluid container.

Fig. 6 is an elevational view partly in section of the electric immersion heater.

Fig. 7 is a diagrammatic drawing of the electric circuit for operating the system.

Figures 1, 2:
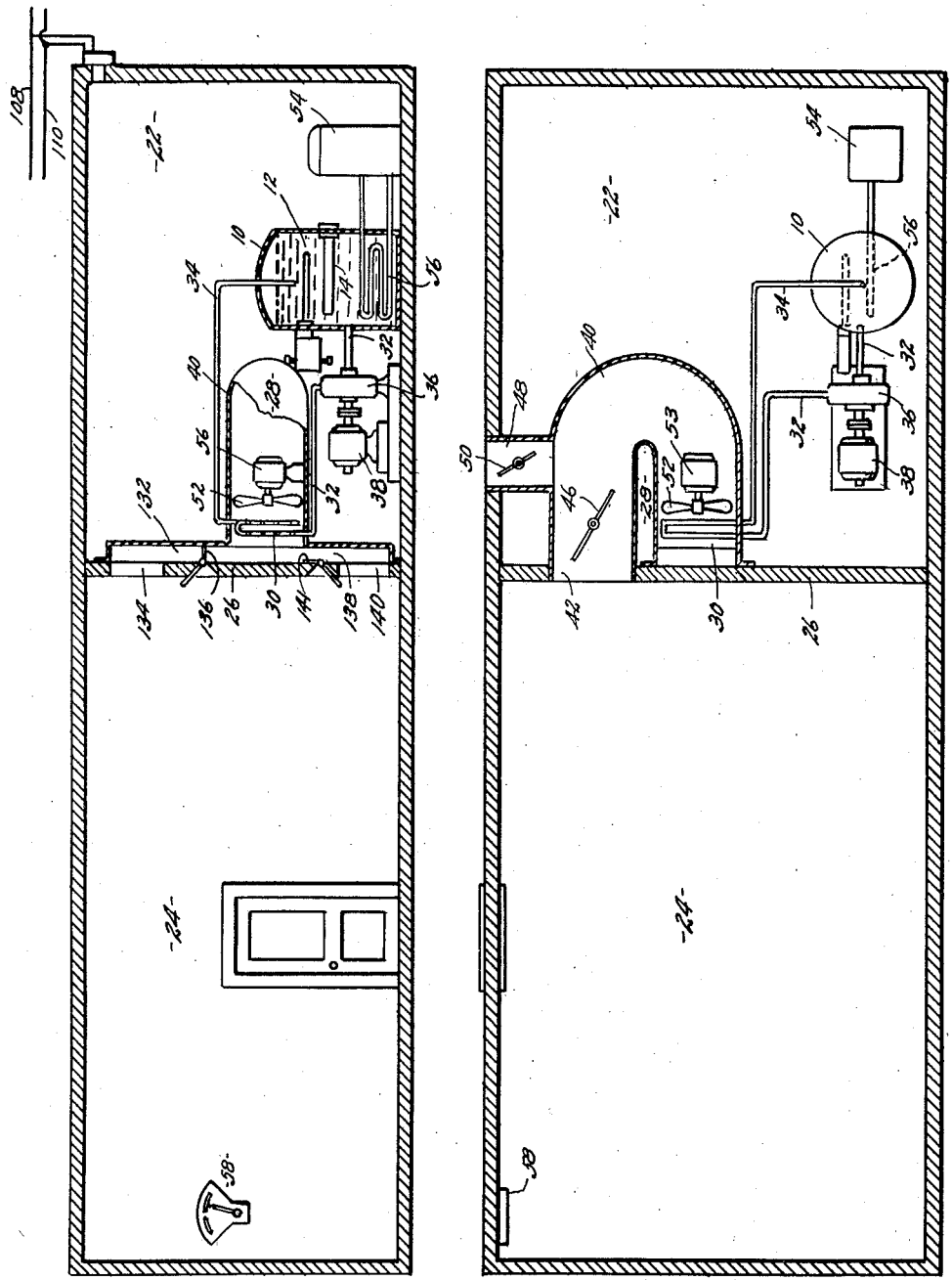
Figure 1 is a diagrammatic illustration of the temperature regulating system, embodying this invention, shown in elevation and with parts broken away.
Fig. 2 is a diagrammatic plan view partly in section of the system shown in Fig. 1.

Throughout the several views like reference characters refer to similar parts and the numeral 10 designates a container containing fluid 12 below the fluid line of which is positioned an electric immersion heater 14. This electric heater 14 may be of sheathed type whereby the resistance conductor 16 is imbedded in a mass of heat refractory and heat conductive electrical insulating material 18 whereby the conductor is supported in spaced relation to the outer casing 20 (see Fig. 6). While this type of heater is perhaps one of the most efficient type of electrical heaters, however, other types of immersion heaters might be used for raising the temperature of the water within the container. The fluid used in container 10 may be a liquid such as water or a gas that will facilitate the transfer of the desired heat units from the container to the heat exchanger.

For the purpose of illustration the heating and cooling apparatus is shown in a room 22 adjacent the room 24, the air of which is to be conditoned. These two rooms are separated by a partition 26. A heat exchanger 28 comprises a coil 30 having a supply connection or conductor 32 and a return connection 34 communicating with the container 10. The supply pipe is provided with a pump 36 which is driven by motor 38. By means of this circulatory system the temperature treated fluid in container 10 is caused to pass through the coil 30 and then back to container 10. Coil 30 is mounted in a U-shaped housing 40, one end of which communicates with openings 42 formed through partition 26, and the other end of which communicates with ducts hereinafter described. The butterfly valve 46 in housing 40 controls the flow of air therethrough. A fresh air intake tube 48 communicates with housing 40 to provide a supply of fresh air from outside the building. The relative proportion of fresh air to the air mixture conditioned is controlled by the butterfly valve 50 which may be set to any desired degree of opening. Mounted in housing 40 at the rear of coil 30 is a suitable air circulating fan 52 having motor 53 which is automatically controlled as hereinafter set forth.

A refrigerator 54 having a cooling coil 56 which is immersed in the water 12 of the container 10 is of any of the well known electric type. The heating and cooling units are necessarily controlled by the temperature of the air within the room being conditioned, and for this purpose the room thermostat 58, best shown in Figs. 3 and 4 is provided. The temperature controlling means for actuating the thermostat may be of any of the well known type (not shown) which operates the arms 60 mounted on the thermostat shaft 62. This arm will indicate the temperature as it points to the series of indicia 64. Since this thermostat functions to selectively operate or cause to operate both the immersion electric heater and the refrigerator, it is necessary that it be provided with two insulated contact strips 66 and 68. The inner face 70 of the contact member 68 and the inner face 72 of the contact member 66 are substantially concentric with shaft 62 so that the resilient contact point 74 will always serve as a wiping contact to carry the current as hereinafter described.

A resilient contact arm 76 is secured to the end of contact strip 68 with its free end normally spaced apart from the resilient arm 78 which is carried by an insulating block 80 secured to contact strip 68. A button 84 of electrical insulating material carried by arm 60 serves to contact the resilient contact arm 76 when the wiping contact 74 engages the inner face 70 of contact strip 68. At all times when the wiping contact 74 is in contact with contact strip 66 resilient arm 78 and 76 will be open. The contact strips 66 and 68 are mounted in an arcuate groove 86 formed in the electric insulating housing 82 as clearly shown in Fig. 4. These contact strips are adapted to be adjusted toward and from each other and along said grooves, thus making it possible to vary the predetermined temperatures at which the room is to be regulated.

Set screws 88 are adapted to secure the contact strips in position after they have been properly adjusted. It is quite apparent that with this type of thermostat, the temperature of the room may be maintained, for example, from 78° to 74° as indicated by the position of the contact strip shown in Fig. 3, and these contact strips may be positioned to regulate the temperature of the room to between 60° to 64° or any other desired temperatures within the limits of adjustable contact strips 66 and 68.

Means is provided to delay the operation of a circulating pump and the fan until the temperature of the fluid within the container 10 has reached a predetermined temperature, and comprises a two point switch 90 controlled by a bimetallic thermostat 92 which operates the bell crank switch arm 94 pivoted at 96 to the electrical insulating plate 98 which is secured to the thermostat housing 100. The push rod 102 of the thermostat has a higher coefficient of expansion than housing 100 thus causing relative longitudinal movement of these parts to present a movement of the short arm of the bell crank arm 94. Contact points 104 and 106 are independently adjustable so as to position them relative to the bell crank arm 94 to obtain any desired temperature range.

Current is supplied to the different electrical units through line wires 108 and 110. One leg of the electric immersion heater is connected by wire 112 to line wire 108. The other leg of said heater is connected by wire 114 through the electrically operated switch 116 with wire 110. Switch 116 is normally open and may be closed by energizing the coil 118 as wiping contact 74 is moved to engage contact strip 66. The thermostat arm 60 is connected by wire 120 through manually operable switch 122 to line wire 108. One end of coil 118 is connected by wire 124 to contact strip 66 and the other end of coil 118 is connected by wire 126 to feed wire 110 thus when arm 60 is moved so that the wiping contact 74 engages the arcuate contact strip 66, the resistance conductor 16 will be energized and the fluid within container 10 will be heated. After the fluid is heated to a predetermined temperature the thermostat 92 will operate bell crank arm 94 to contact point 104. This point is connected through wire 128 with the power line 110. Bell crank arm 94 is connected by wire 130 through motor 38, wire 91, motor 53, wire 93, to line wire 108 so that when the temperature of the fluid in container 10 has been raised sufficiently the pump 36 will be operated to cause a circulation of the heated fluid through the coil 30 thence through connection 34 and back to the container. Motor 53 will also operate to drive fan 52 thus causing a current of air from the room to be driven through the heated coil 30 for transferring the heat to the room.

Referring to Fig. 1 it will be noted that housing 40 is provided with an upwardly extending duct 132 which communicates with an opening 134 formed through partition 26. This duct is provided with a control valve 136 by means of which the flow of air therethrough may be manually controlled. A depending duct 138 communicates with an opening 140 formed adjacent the bottom of the partition. This duct also is provided with a control valve 141. For proper air conditioning the warm air should be forced downwardly through opening 140 to the room 24 while the cool air should be forced upwardly through duct 132 and opening 134 to obtain the proper positioning of the air within the room. Wire 142 connects one post of the refrigerator with the line wire 108 while the other post is connected by wire 144 through switch 146 to the line wire 110. Switch 146 is controlled by the electromagnet 148 one end of the coil of which is connected by line wire 150 to line wire 110 and the other end of the coil is connected by wire 152 to arcuate contact strip 68, through switch members 76 and 78.

The operation of this heating and cooling system is such that a substantially constant temperature will be automatically maintained in the room regardless of whether the outside temperature is above or below the desired temperature. During the spring and fall months the temperature may vary above and below the desired room temperature, thus requiring the operation of the heating or cooling means at different times in order to raise or lower the room temperature relative to the outside atmosphere.

Considering that the room thermostat is set as indicated in Fig. 3 of the drawings, and that the atmospheric or outside temperature is below the desired room temperature, which is substantially 75°. Arm 60 will be normally contacting arcuate contact member 66 and when the operator closes switch 122, the coil 118 will be energized and switch 116 will be closed so that heating coil 16 immersed in the fluid in container 10 will be heated. When the fluid reaches a predetermined temperature, for example, 180°, the thermostat will close the circuit to motors 38 and 53 through bell crank lever 94 and adjustable contact point 104. Motor 38 will operate pump 36 to force the heated fluid from container 10 through heat exchanger coil 30 thence back to the container. Motor 53 will simultaneously operate fan 52 to drive air through coil 30 to carry warm air into the room 24. The air from the room 24 may be recirculated with the addition of any desired proportion of fresh outside air through duct 48. The room 24 may be ventilated by any of the well known means.

When the temperature in the room 24 has reached the 75° mark the contact 74 will leave the arcuate contact bar 66 and the heater 16, motors 38 and 53 will be cut off and if the outside temperature is below 75° the room will gradually cool and the arm 60 will move back so that 74 will again contact bar 66 and the heating operation will again be repeated. Should the outside temperature be above 75° the room temperature will be increased, and the arm 60 of the room thermostat will move forward so that member 74 will contact arcuate bar 68 and at the same time close resilient contact members 76 and 78 thus closing the electric circuit through coil 148, which will close switch 146 to complete the circuit through the refrigerator 54 so that the cooling unit immersed in fluid 12 will lower the temperature of the fluid to a temperature materially below 75° thus contracting the thermostat rod 102 and causing arm 94 to contact point 106 to close the circuit through motors 38 and 53 to circulate the cool fluid through coil 30 and the air over the coil as previously described, thus lowering the temperature in room 24. By separating the arcuate contact bars 66 and 68 to a greater distance the range of temperature change of operation from the heater to the cooler will be increased. This is also true when changing from the cooling to the heating operation.

While the invention has been described in detail it is to be understood that the description is for the purpose of illustration only and is not intended to limit the invention. The right is reserved to make such changes in the details of construction and arrangement of parts as will fall within the scope of the appended claims.

It is apparent that I have produced a novel automatic heating and cooling device that is adapted for use with old heating installations of the heat exchange type or may be used for new installations.

What I claim is:

1. In an air temperature regulating system a fluid container positioned outside the room to be conditioned; a heat exchanger positioned outside and communicating with the room to be conditioned and having supply and return connections with said fluid container; an electric heater immersed in the fluid in said container; a refrigerator having a cooling unit immersed in the fluid of said container; an electric circuit controlled by means actuated by differential of temperatures of the air in the room being regulated, whereby to selectively operate said immersion heater and said refrigerator to maintain the temperature of said room within certain predetermined limits; means for creating a flow of fluid from said container to said heat exchanger and a thermostat actuated by the temperature of the fluid in said container to control the flow of fluid from said container to said heat exchanger.

2. In an air temperature regulating system a fluid container; a heat exchanger having supply and return connections with said fluid container; an electrically driven pump in one of said connections; an electric heater immersed in the fluid of said container; a refrigerator having a cooling unit immersed in the fluid of said container; an electric circuit controlled by means actuated by differentials of temperatures of the air in the room being regulated, whereby to selectively operate said immersion heater and said refrigerator to maintain the temperature of said room within certain predetermined limits; and thermostatic means controlled by the temperature of the fluid in said container to maintain the electric circuit to said pump open until a predetermined temperature of said fluid is reached.

3. In an air temperature regulating system a fluid container; a heat exchanger including a coil and a motor driven fan and having supply and return connections with said container; an electric heater immersed in the fluid within said container; an electric refrigerator having a cooling unit immersed in the fluid within said container; an electrically driven pump in one of said connections between the heat exchanger and container, whereby fluid from said container is forced through said heat exchange coil; and an electric circuit controlled by the differential of temperature in the room being regulated whereby the heating coil and the refrigerator are selectively operated to maintain the temperature of said room within certain predetermined limits.

4. In an air temperature regulating system a fluid container; a heat exchanger including a coil and motor driven fan and having supply and return connections with said container; an electric heater immersed in the fluid within said container; an electric refrigerator having a cooling unit immersed in the fluid within said container; an electrically driven pump in one of said connections between the heat exchanger and container, whereby fluid from said container is forced through said heat exchanger coil; an electric circuit controlled by the differential of temperature in the room being regulated whereby the heating coil and the refrigerator are selectively operated to maintain the temperature of said room within certain predetermined limits; and adjustable means within said electric circuit whereby the range of temperature between the said predetermined limits may be varied.

5. In an air temperature regulating system a fluid container; a heat exchanger including a coil and a motor driven fan and having supply and return connections with said container; an electric heater immersed in the fluid within said container; an electric refrigerator having a cooling unit immersed in the fluid within said container; an electrically driven pump in one of said connections between the heat exchanger and container, whereby fluid from said container is forced through said heat exchanger coil; an electric circuit controlled by the differential of temperature in the room being regulated whereby the heating coil and the refrigerator are selectively operated to maintain the temperature of said room within certain predetermined limits, and thermostatic means controlled by the temperature of the fluid within said container whereby said heat exchanger motor fan and said pump are operated only after the temperature of said fluid has reached a predetermined degree.

PAUL A. JOHNSON.

REFERENCES CITED

The following references are of record in the file of this patent:

UNITED STATES PATENTS

| Number | Name | Date |
| --- | --- | --- |
| 1,747,683 | Shirk | Feb. 18, 1930 |
| 1,988,495 | Hulse | Jan. 22, 1935 |
| 2,000,467 | Lindseth | May 7, 1935 |
| 2,072,166 | Goodman | Mar. 2, 1937 |
| 2,291,769 | Smellie | Aug. 4, 1942 |
| 2,343,147 | Katsulos | Feb. 29, 1944 |